US012571696B2

(12) United States Patent　　　(10) Patent No.: US 12,571,696 B2
Cattaneo et al.　　　　　　　　　(45) Date of Patent: Mar. 10, 2026

(54) METHOD TO CHECK THE CORRECT FUNCTIONING OF A TIGHTENING TOOL

(71) Applicant: ATLAS COPCO INDUSTRIAL TECHNIQUE AB, Stockholm (SE)

(72) Inventors: Massimiliano Cattaneo, Carate Brianza (IT); Gianmaria Celico Fadini, Nova Milanese (IT); Roberto Gerosa, Bellusco (IT); Daniele Azzone, Paderno Dugnano (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 370 days.

(21) Appl. No.: 18/039,686

(22) PCT Filed: Dec. 2, 2021

(86) PCT No.: PCT/IB2021/061221
§ 371 (c)(1),
(2) Date: May 31, 2023

(87) PCT Pub. No.: WO2022/118232
PCT Pub. Date: Jun. 9, 2022

(65) Prior Publication Data
US 2024/0035909 A1　Feb. 1, 2024

(30) Foreign Application Priority Data

Dec. 3, 2020　(IT) ........................ 102020000029621

(51) Int. Cl.
G01L 5/24　　(2006.01)
G01L 3/20　　(2006.01)
G01L 25/00　　(2006.01)
(52) U.S. Cl.
CPC .................. G01L 5/24 (2013.01); G01L 3/20 (2013.01); G01L 25/003 (2013.01)

(58) Field of Classification Search
CPC . G01L 5/24; G01L 3/20; G01L 25/003; B25B 23/1425; B25B 23/147;
(Continued)

(56) References Cited

U.S. PATENT DOCUMENTS 10,317,304 B2 *　6/2019　Boccellato ............. B25H 1/005
10,641,675 B2 *　5/2020　Boccellato ............ G01L 25/003
(Continued)

FOREIGN PATENT DOCUMENTS

EP　　　　3623108 A1　　3/2020
WO　　2016170463 A1　10/2016
(Continued)

OTHER PUBLICATIONS

International Application No. PCT/IB2021/061221, International Search Report and Written Opinion mailed on Feb. 2, 2022, 9 pages.

*Primary Examiner* — Jonathan M Dunlap
(74) *Attorney, Agent, or Firm* — Kilpatrick Townsend & Stockton LLP

(57) ABSTRACT

Method to check the correct functioning of a tightening tool, such as an industrial screwdriver, placed on a test bench. Said bench includes a plurality of hydraulic brakes (F1-Fn), to which the instrument is associated, suitably controlled by a hydraulic circuit. Each brake is equipped with measurement transducers (TR) capable of measuring the torque exerted and the angle of rotation on this brake, connected to an electronic driver card (SP), which also controls the hydraulic circuit. The bench also includes an electronic processing unit (U) which communicates with the card and which includes an adequate driving program memorized on it capable of regulating the braking capacity of the brakes through the hydraulic circuit according to a predetermined braking torque/angle of rotation curve of the brakes. The method comprises the steps of acquiring one or more real tightening curves torque exerted/angle of rotation during one (Continued)

or more tightening performed for example with the tool to be tested, elaborating said real curve to make it compatible with the format of the curves that can be inserted in said test bench, supplying such one or more curves at the input to the test bench and in particular to one or more selected brakes (F1-Fn), performing a tightening with the tool on the selected brake.

7 Claims, 3 Drawing Sheets

(58) Field of Classification Search
CPC .............. B25B 23/145; B25B 23/1475; B25B 23/1453; B25B 23/1456; B25B 23/1422; B25B 23/142; B25B 23/14; B25B 23/1405
See application file for complete search history.

(56) References Cited

U.S. PATENT DOCUMENTS

| | | | | |
|---|---|---|---|---|
| 10,935,450 | B2 * | 3/2021 | Cattaneo ............. | G01M 99/007 |
| 11,237,072 | B2 * | 2/2022 | Celico Fadini ..... | G01M 99/007 |
| 2017/0363500 | A1 * | 12/2017 | Boccellato .............. | G01N 3/22 |
| 2018/0136070 | A1 * | 5/2018 | Boccellato ........... | G01L 25/003 |
| 2019/0162620 | A1 * | 5/2019 | Cattaneo ............... | G01L 25/003 |
| 2020/0340878 | A1 * | 10/2020 | Celico Fadini ....... | G01L 25/003 |

FOREIGN PATENT DOCUMENTS

| | | | | |
|---|---|---|---|---|
| WO | WO-2016170462 A1 * | 10/2016 | .............. | G01L 5/24 |
| WO | 2019111146 A1 | 6/2019 | | |

* cited by examiner

METHOD TO CHECK THE CORRECT FUNCTIONING OF A TIGHTENING TOOL

CROSS-REFERENCE TO RELATED APPLICATIONS

The present application is a § 371 National Phase Application of PCT/IB2021/061221, filed Dec. 2, 2021, which application claims priority and benefit to Italian Patent Application No. 102020000029621, filed on Dec. 3, 2020, the disclosure of each of which is incorporated herein by reference in its entirety for all purposes herein.

The present invention relates to an electronic method to check the correct functioning of a tightening tool, such as an industrial screwdriver, by means of a test bench on which one or more hydraulic braking devices are positioned.

A test bench of this type is described in patent application WO2019111146 and illustrated in FIG. 1. This bench comprises a plurality of hydraulic brakes F1-Fn, to which the screwdriver is associated, suitably controlled by a hydraulic circuit comprising at least one pump P, which withdraws the fluid from a reservoir T and provides it to a pressure regulating valve VP, which in turn provides it to the brakes.

Each brake is equipped with measurement transducers TR connected to an electronic driver card SP, which also controls such a regulating valve VP.

The bench also comprises an electronic processing unit U which communicates with said card and which includes an adequate driving program memorized on it. Each brake simulates the conditions of a joint (e.g. a nut or screw) that must be tightened by the screwdriver under test.

The driving program, once an operator has selected the brake to be used for testing the screwdriver, is capable to progressively increase the braking capacity of the brakes by adjusting the pressure, until reaching a complete stop of the electronic screwdriver.

A hydraulic distributor D is present between such brakes and the regulating valve VP, such hydraulic distributor comprising solenoid valves E1-En able to select, operate and control the hydraulic pressure of each brake to which it is selectively connected.

The control system of this type of bench includes a first negative feedback loop and a pressure regulator for each of these solenoid valves E1-En of the proportional integrative type which ensure that the real pressure curve exerted on the brakes corresponds to the one desired and set and a second negative feedback loop and a second regulator to ensure that this real torque/angle curve measured by the transducers TR present on the brakes corresponds with the curve that one wishes to set; this second regulator determines the pressure reference value.

Such second loop is advantageous because linear pressure ramps that may be obtained by controlling the first feedback loop do not necessarily generate linear torque ramps.

Moreover, such second loop allows managing generic torque curves (not necessarily ramps). A trajectory tracking system based on a torque curve and not on a pressure curve is necessary to improve the simulation of the joints. In practice, the control system operates in such a way as to be able to drive the tightening test on the basis of a torque-angle curve supplied at the input to the input system.

The Applicant has observed that thanks to the type of control system described above, the torque/angle curves that are supplied at the input to the system can be real curves, i.e. detected during a tightening of a joint (for example a nut or a screw) that is tightened from the screwdriver.

An aspect of the present invention relates to a method to check the correct functioning of industrial screwdrivers by means of hydraulic braking devices having the features of the appended claim 1.

The features and advantages of the method according to the present invention will be clearer and evident from the following illustrative and non-limiting description, of an embodiment, made with reference to the accompanying figures illustrating respectively:

Figures 1, 4:
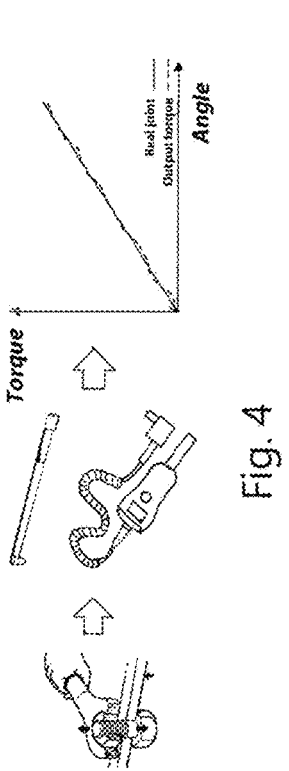
FIG. 1 shows an overview scheme of a test bench to check industrial screwdrivers.
Figures 5, 6, 7:
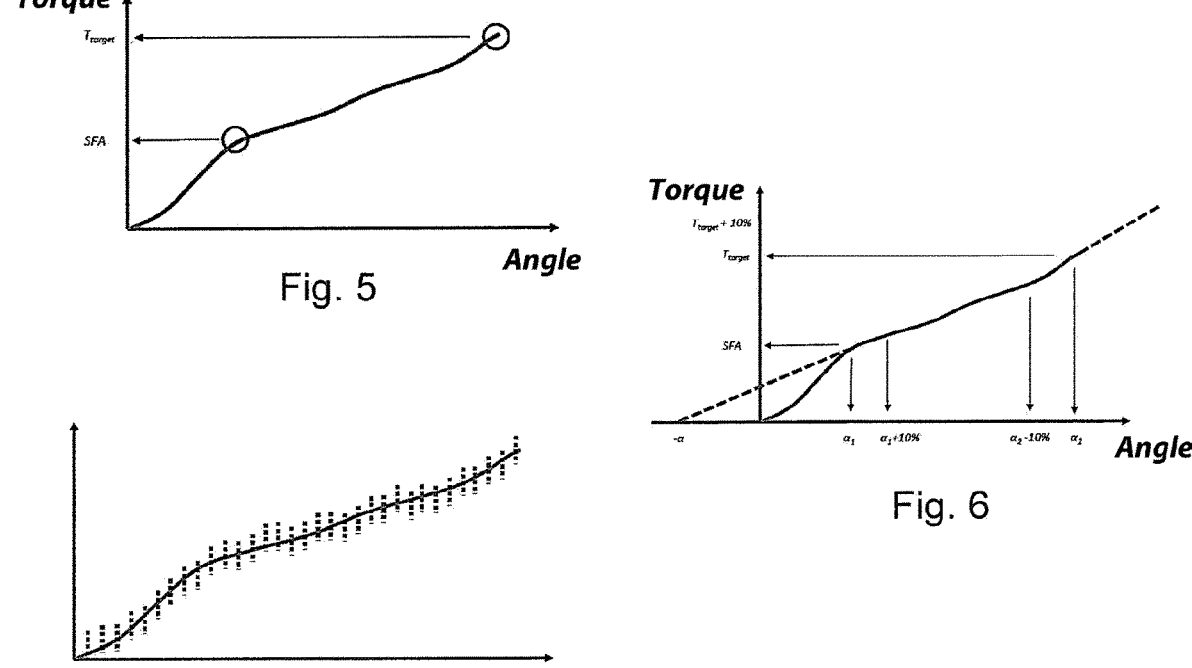

FIG. 4 schematises the steps of the method according to the present invention applied to the test bench of FIG. 1;

FIGS. 5, 6 and 7 illustrate examples of possible elaborations on the real torque/angle curves to be acquired.

With reference to the aforementioned figures, the bench or the check system comprises a plurality of hydraulic brakes F1-Fn, to which the screwdriver is associated, suitably controlled by a hydraulic circuit comprising at least one pump P, which withdraws the fluid from a reservoir T and provides it to a pressure regulating valve VP, which in turn provides it to the brakes.

In the system, there is also a manifold C for the collection of the fluid (i.e. oil) placed in the hydraulic circuit downstream of the brakes. The pump is equipped with an accumulator ACC and with a selector S for changing the maximum pressure of the circuit.

Each brake is equipped with external measurement transducers TR connected to an electronic driver card SP, which also controls such regulating valve VP. An electronic processing unit which communicates with said card includes an adequate driving program memorized on it.

The driving program, once the operator has selected the brake to be used for testing the screwdriver A, is able to modulate the braking capacity of the brakes by adjusting the pressure, until reaching a complete stop of the electronic screwdriver.

A hydraulic distributor D is present between such brakes F1-Fn and the regulating valve VP, such hydraulic distributor comprising solenoid valves E1-En able to select and operate each brake to which it is selectively connected.

The hydraulic distributor D comprises a number of solenoid valves E1 . . . En corresponding to the number of braking devices present F1 . . . Fn. The electronic processing unit programs the electronic card that enables the valve associated with the brake selected for the test. Thereby, the hydraulic power flows from the manifold only to the braking device involved in the test. To avoid consumption and safety problems, 3-way normally closed solenoid valves have been chosen.

In this manner, the pressure is adjusted individually for each brake, thus carrying out a dedicated control on each of them.

Figures 2, 3:
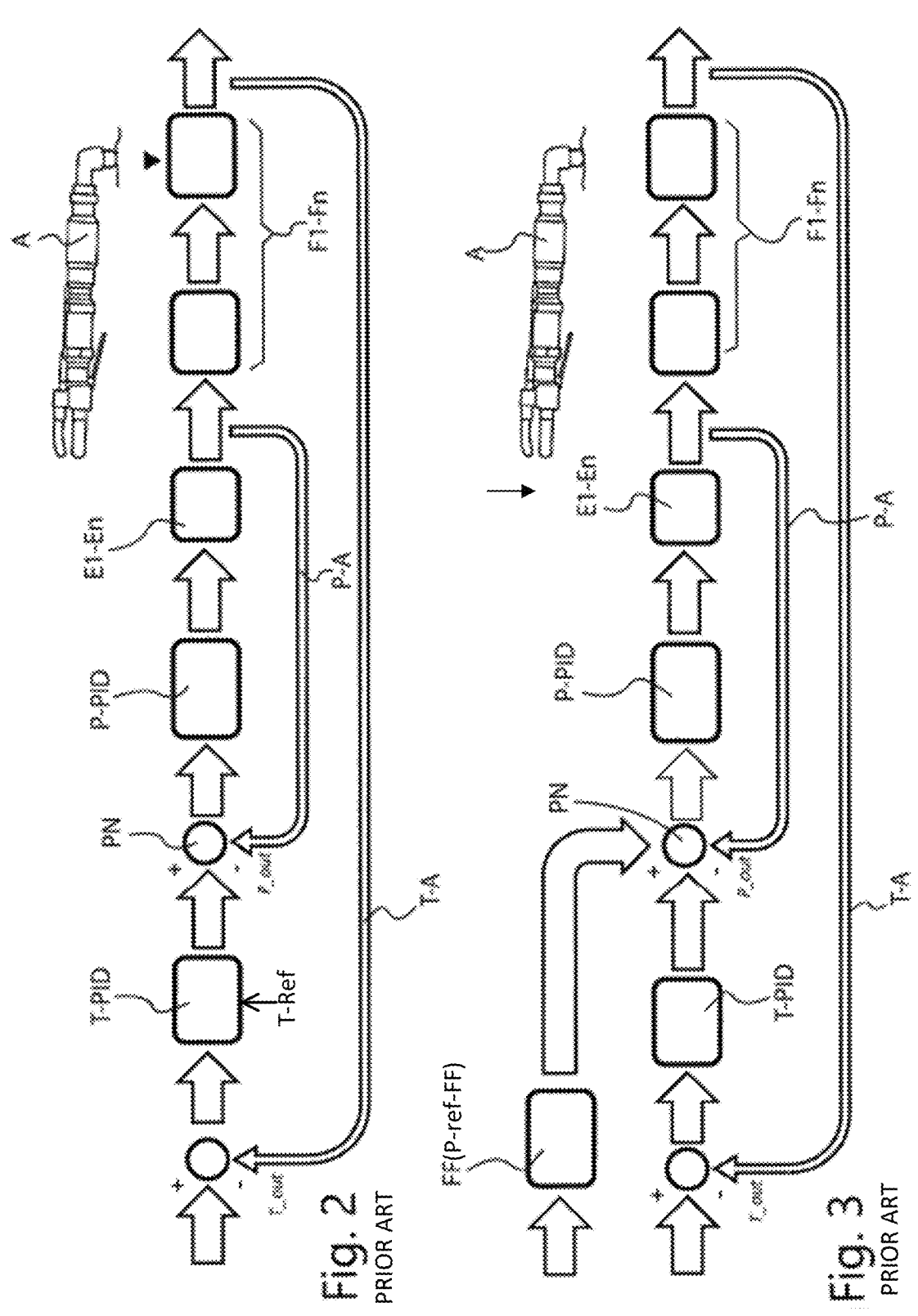
FIG. 2 shows a block diagram of a control system for the bench of FIG. 1.
FIG. 3 shows a block diagram of a control system for the bench of FIG. 1 according to a further embodiment of the present invention.

The adjustment of the pressure performed by the electronic card in each valve occurs according to the block diagrams illustrated in FIGS. 2 and 3.

Normally in such benches, the solenoid valves E1-En provide for the presence of a first negative feedback loop P-A and a pressure regulator P-PID of proportional integral type and possibly also of derivative type (known as PID regulator) which ensure that the real pressure curve P-out exerted on the brakes corresponds to the desired and set curve P-ref.

The system comprises a second negative feedback loop T-A and a second regulator T-PID, for example of the proportional integral and possibly also of derivative type, to ensure the real torque/angle curve T-out measured by means of torque and angle sensors TR present on the brakes corresponds with the curve that one wishes to set T-ref. Such second regulator determines the pressure reference value P-ref.

Such second loop is advantageous because linear pressure ramps that may be obtained by controlling the first feedback loop do not necessarily generate linear torque ramps.

Moreover, such second loop allows managing generic torque curves (not necessarily ramps).

A trajectory tracking system based on a torque curve and not on a pressure curve is necessary to improve the simulation of the joints.

According to a further feature of the present invention, in addition to the second feedback loop, the control system also comprises a predictive contribution determined by a pressure value P-ref-FF which is added to the reference value P-ref on the error node PN of the first loop P-A (known as feed forward contribution).

Such pressure value is obtained by means of a study on the system dynamics, which starting from the desired torque value T-ref in a calculation block FF, determines a corrective pressure value P-ref-FF.

The control action generated is purely corrective; the effect is to have an output torque curve that is temporally always delayed with respect to the desired one. Such predictive term based on the study of the system dynamics is added to improve the performance in terms of response speed.

The aim of the control system is to simulate a braking as closely as possible to the braking curve (torque, angle) that the industrial screwdriver undergoes during its normal working cycle when tightening. Therefore, the optimal control method is achieved by allowing a curve created by monitoring a real tightening of a joint with the same screwdriver, as shown in the diagram in FIG. 4, to be supplied at the input to the electronic control system. Alternatively, a different screwdriver can also be used, as what is important is the characteristic of the joint.

In particular, a real tightening is achieved by means of a screwdriver on a joint equipped with a transducer to detect the torque/tightening angle curve or a torque wrench or similar tool equipped with sensors is used to detect the real torque/tightening angle curve.

Once this real curve has been detected and memorized, it can possibly be elaborated to make it compatible with the settings provided on the test bench and then supplied at the input to the bench control system.

On the basis of this curve, the most suitable brake in the bench is selected. Typically, this selection is made according to the brake capacity, which must be compatible with the target torque to be reached.

For example, at least one window or portion of the detected real curve is considered between an initial angle value SFA (see FIG. 5) and a maximum final torque value $T_{target}$.

This window or portion comprises a torque window and an angle window. The Start Final Angle (SFA) is the torque at which the angle starts to be measured. At that point the angle is zero for the tool but the torque has a non-zero value.

This curve can be adapted by using a polynomial algorithm, so as to be able to choose the level of precision with which to follow it and at the same time obtain a filtering of any peaks acquired on the real joint due to possible disturbances, etc.

The aforesaid portion of curve selected through the validity window must be extended in the initial part so as to join the initial torque value T=0 and in the final part so as to arrive at a torque value configurable higher than the peak one $T_{target}$, e.g. 10% above the peak value $T_{target}$, as illustrated in FIG. 6 (dashed parts of the curve).

A further elaboration can be carried out by averaging the torque values detected for each angle value.

In fact, a plurality of torque values are memorized for each angle value. When the imparted rotation is very slow, the torque samples increase and do not coincide with each other, as illustrated in FIG. 7.

Typically, for each angle value, a mathematical average of all detected torque values is calculated. Alternatively, an elaboration can be carried out which maintains only the maximum or minimum values.

Finally, the curve can be calibrated by making the sampling rate of the torque/angle values acquired by the tightening tool compatible with the sampling rate of the test bench.

The invention claimed is:

1. A method for checking the correct functioning of a tightening tool, comprising:

placing the tightening tool on a test bench, said bench including, a plurality of hydraulic brakes each hydraulic brake being associated with the tightening tool and being controlled by a hydraulic circuit;

each hydraulic brake comprising at least one measurement transducer configured to measure torque exerted and angle of rotation on the respective hydraulic brake, wherein each measurement transducer is connected to an electronic driver card that controls the hydraulic circuit;

an electronic processing unit configured to communicate with the electronic driver card and including a stored driving program that regulates braking capacity of the hydraulic brakes via the hydraulic circuit according to a predetermined braking torque versus angle of rotation curve;

acquiring at least one real tightening curve representing torque exerted versus angle of rotation during a tightening operation performed with the tightening tool;

processing the at least one acquired tightening curve to convert it into a format compatible with input requirements of the test bench, wherein said processing comprises at least one of: selecting a portion of the curve between a defined initial angle value and a defined maximum torque value, extending the curve at the initial and final parts, filtering torque peaks, and adapting the sampling rate;

supplying the processed tightening curve to the test bench by inputting the curve to a selected hydraulic brake; and performing a tightening operation with the tightening tool on the selected hydraulic brake using the supplied tightening curve.

2. The method according to claim 1, wherein said step b) of processing the acquired tightening curve comprises selecting at least a window or a portion of said curve comprised between an initial angle value (SFA) and a maximum final torque value ($T_{target}$).

3. The method according to claim 2, wherein the selected portion of the tightening curve is extended in the initial part, so as to join the initial torque value and in the final part so as to arrive at a torque value configurable higher than the peak one ($T_{target}$).

4. The method according to claim 3, wherein said higher configurable torque value is about 10% over the peak value ($T_{target}$).

5. The method according to claim 1, wherein processing the acquired tightening curve comprises calculating, for each angle value in the curve, a mathematical average of all detected torque values obtained from a plurality of tightening operations.

6. The method according to claim 1, wherein processing the acquired tightening curve comprises, for each angle value, selecting the maximum torque value detected from a plurality of tightening operations.

7. The method according to claim 1, wherein processing the acquired tightening curve comprises making the sampling rate of the torque and angle values acquired by the tightening tool compatible with the sampling rate of the test bench.

* * * * *